(12) United States Patent
Takahashi (10) Patent No.: US 8,776,054 B2
(45) Date of Patent: Jul. 8, 2014

(54) FLEXIBLE ACCESS CONTROL FOR A VIRTUAL COMPUTER DEVICE, VIRTUAL COMPUTER SYSTEM, AND VIRTUAL COMPUTER PROGRAM, AND METHOD FOR CONTROLLING THE SAME

(75) Inventor: Hideyuki Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 230 days.

(21) Appl. No.: 12/996,921

(22) PCT Filed: Jun. 12, 2009

(86) PCT No.: PCT/JP2009/061153
§ 371 (c)(1),
(2), (4) Date: Dec. 8, 2010

(87) PCT Pub. No.: WO2010/010765
PCT Pub. Date: Jan. 28, 2010

(65) Prior Publication Data
US 2011/0088031 A1      Apr. 14, 2011

(30) Foreign Application Priority Data

Jul. 22, 2008  (JP) ................................. 2008-188132

(51) Int. Cl.
G06F 9/455    (2006.01)
G06F 9/46     (2006.01)
G06F 21/00    (2013.01)
G06F 13/00    (2006.01)

(52) U.S. Cl.
USPC .................... 718/1; 718/104; 711/6; 711/152

(58) Field of Classification Search
None
See application file for complete search history.

(56) References Cited

U.S. PATENT DOCUMENTS

| | | | | |
|---|---|---|---|---|
| 6,496,847 B1 * | 12/2002 | Bugnion et al. | ................... | 718/1 |
| 6,944,699 B1 * | 9/2005 | Bugnion et al. | ............. | 710/269 |
| 7,496,495 B2 * | 2/2009 | Solomon et al. | ................ | 703/26 |
| 8,156,503 B2 * | 4/2012 | Ben-Yehuda et al. | ........ | 718/104 |
| 8,380,907 B2 * | 2/2013 | Heller et al. | ................... | 710/260 |
| 2005/0228769 A1 | 10/2005 | Oshima et al. | | |
| 2006/0143517 A1 * | 6/2006 | Douceur et al. | ................ | 714/21 |
| 2008/0005297 A1 * | 1/2008 | Kjos et al. | ..................... | 709/223 |

(Continued)

FOREIGN PATENT DOCUMENTS

| | | |
|---|---|---|
| EP | 1674992 A | 6/2006 |
| JP | 1-197844 A | 8/1989 |

(Continued)

OTHER PUBLICATIONS

International Search Report for PCT/JP2009/051153 mailed Jul. 28, 2009.

*Primary Examiner* — Abdullah Al Kawsar
(74) *Attorney, Agent, or Firm* — Sughrue Mion, PLLC (57) ABSTRACT

Lack of freedom in the operation of terminals has been a problem. On the other hand, there has been concern that allowing freedom of operation would negatively impact systems. A virtual computer device is provided with a memory unit and a CPU. The CPU executes an access program, which has the CPU input from or output to the memory unit in accordance with a received input/output request, and a VM monitor which implements a virtual computer in the CPU. Under the control of the VM monitor, the CPU executes a VM program which sends a input/output request to the access program, and via the access program, has the CPU input from or output to the storage device.

11 Claims, 8 Drawing Sheets

(56) References Cited

U.S. PATENT DOCUMENTS

| | | | |
|---|---|---|---|
| 2008/0065854 A1* | 3/2008 | Schoenberg et al. | 711/203 |
| 2008/0082811 A1* | 4/2008 | Davis et al. | 713/2 |
| 2009/0144510 A1* | 6/2009 | Wibling et al. | 711/147 |
| 2009/0172165 A1* | 7/2009 | Rokuhara et al. | 709/226 |
| 2009/0328225 A1* | 12/2009 | Chambers et al. | 726/26 |
| 2012/0023591 A1* | 1/2012 | Sahita et al. | 726/27 |

FOREIGN PATENT DOCUMENTS

| | | |
|---|---|---|
| JP | 5-53841 A | 3/1993 |
| JP | 2002374361 A | 12/2002 |
| JP | 2005122229 A | 5/2005 |
| JP | 2005301639 A | 10/2005 |
| JP | 2006185446 A | 7/2006 |

* cited by examiner

ACCESS TABLE 80

| ACCESS NAME | FILE NAME | CONDITION |
|---|---|---|
|  |  |  |
| . | . | . |
| . | . | . |
| . | . | . |

FLEXIBLE ACCESS CONTROL FOR A VIRTUAL COMPUTER DEVICE, VIRTUAL COMPUTER SYSTEM, AND VIRTUAL COMPUTER PROGRAM, AND METHOD FOR CONTROLLING THE SAME

This application is the National Phase of PCT/JP2009/061153, filed Jun. 12. 2009 which claims priority based on Japanese application Japanese Patent Application No. 2008-188132 filed on Jul. 22, 2008, the disclosure of which is incorporated herein in its entirety.

TECHNICAL FIELD

The present invention relates to a virtual computer device, a virtual computer system, a virtual computer program and a control method.

BACKGROUND ART

In patent document 1, a virtual console technology which enables to perform maintenance of a PC server by using a cellular phone is disclosed.
[Patent document 1] Japanese Patent Application Laid-Open No. 2002-374361

DISCLOSURE OF INVENTION

Problem to be Solved

In the technology in the above-mentioned patent document 1, the operation available from a cellular phone is limited to the range of a menu prepared in advance. Accordingly, there has been a problem that it has no flexibility in operation. On the other hand, when freedom of operation is allowed, there has been concern that it would negatively influence systems.

An object of the present invention is to provide a virtual computer device, a virtual computer system, a virtual computer program and a control method which settle the above-mentioned problem.

Means for Solving the Problem

A virtual computer device of one embodiment of the present invention is provided with: a memory unit; and a CPU which executes an access program that makes said CPU perform input from or output to said memory unit according to an input/output request that has been received and a VM monitor that makes said CPU realize a virtual computer, and which executes a VM program that, under the control of said VM monitor, makes said CPU issue said input/output request to said access program to perform input from or output to said memory unit via said access program.

A computer-readable recording medium of one embodiment of the present invention stores a virtual computer program, said virtual computer program comprising: an access program which is executed by a computer that includes a memory unit and executes a VM monitor for realizing a virtual computer, and makes said computer perform input from or output to said memory unit according to an input/output request that has been received; and a VM program which is executed by said computer under control of said VM monitor, and makes said computer issue said input/output request to perform input from or output to said memory unit via said access program.

A control method of one embodiment of the present invention is that a computer that comprises a memory unit and executes a VM monitor for realizing a virtual computer: executes an access program that makes said computer perform input from or output to said memory unit according to an input/output request that has been received; and executes a VM program that, under the control of said VM monitor, makes said computer issue said input/output request to perform input from or output to said memory unit via said access program.

Effects of The Invention

While enabling flexible description of a program, negative influence on a system by such program is prevented.

REFERENCE SIGNS LIST

10 Virtual computer system
20 Virtual computer device
21 Computer
22 CPU
30 Memory unit
31 Memory
32 External storage
33 File
40 Virtual computer program
41 Access program
42 VM program
43 Host OS
44 VM monitor
45 Guest OS
46 Business program
50 Virtual computer
51 Virtual memory
52 Virtual disk
60 Network
70 Terminal
80 Access table
81 Access name
82 File name
83 Condition
90 Recording medium

MOST PREFERRED MODE FOR CARRYING OUT THE INVENTION

Figure 1:
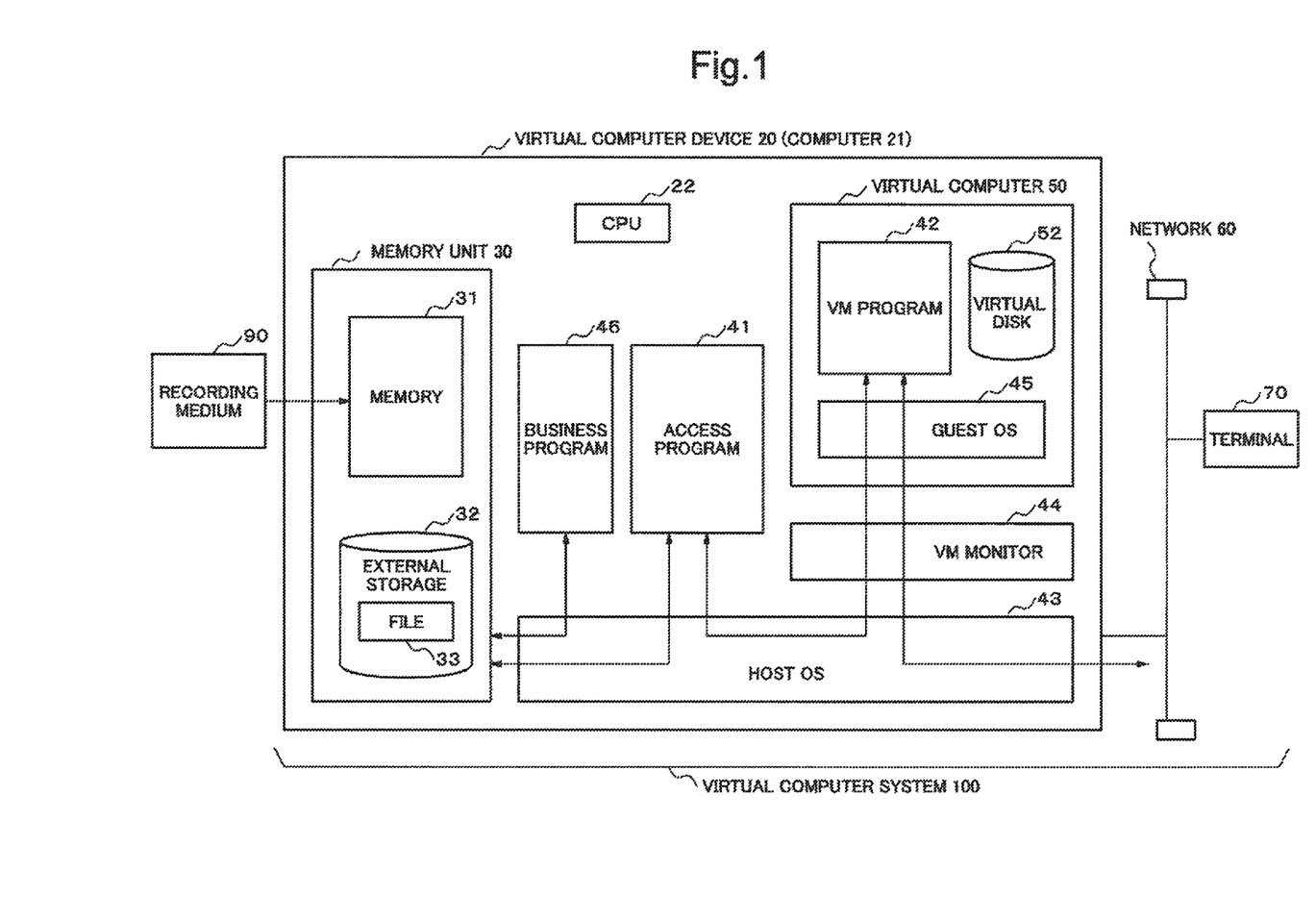
FIG. 1 is a block diagram of a virtual computer system 10 of the first embodiment of the present invention.

FIG. 1 is a block diagram of a virtual computer system 10 of the first exemplary embodiment of the present invention. The virtual computer system 10 includes a virtual computer device 20 and a terminal 70 connected via a network 60. The network 60 may be a LAN (Local Area Network) or may be a WAN (Wide Area Network). A plurality of terminal 70s may exist. The virtual computer system 10 is a system for business processing such as account processing, for example, and an operator performs maintenance work from the terminal 70 according to need.

The virtual computer device 20 includes a CPU 22 (Central Processing Unit) and the memory unit 30. Further, the virtual computer device 20 includes a host OS 43 (Operating System), a VM monitor 44 (Virtual Machine), a business program 46, the access program 41, a guest OS 45 and the VM program 42. The memory unit 30 includes a memory 31 and an external storage 32. The external storage 32 stores a file 33. The external storage 32 is a disk device, for example. The virtual computer device 20 is a computer 21, for example.

Figure 2:
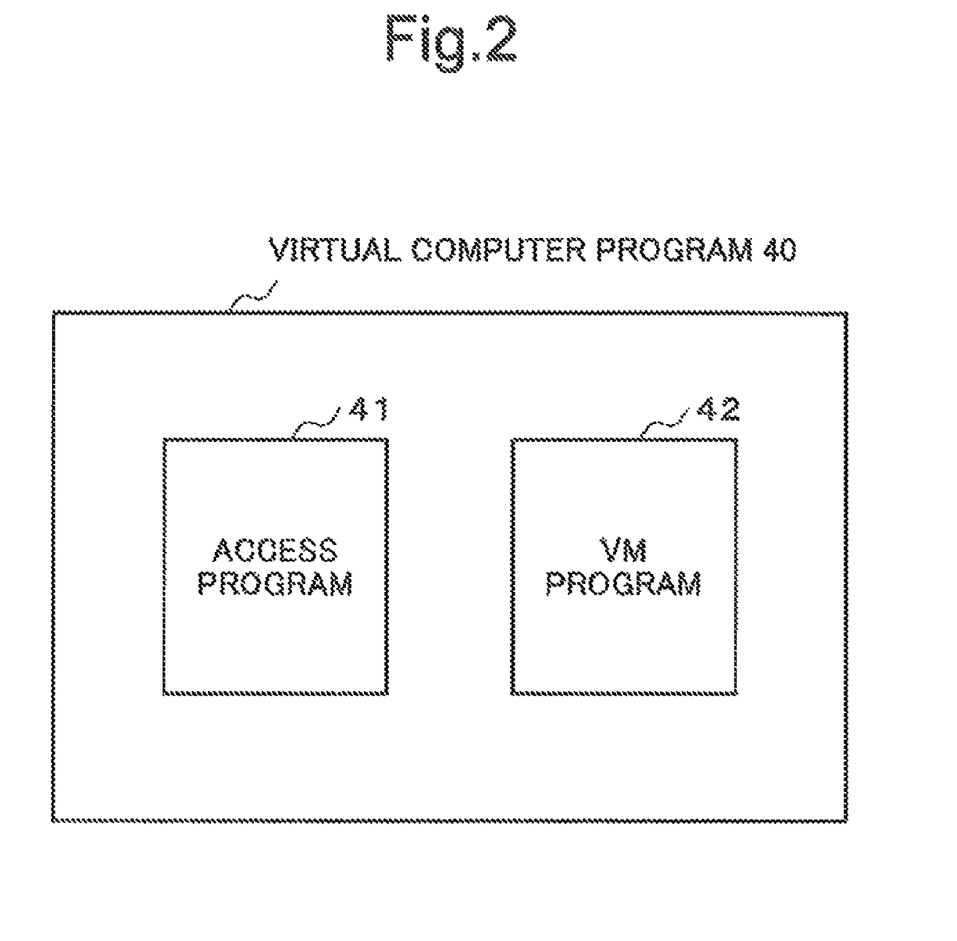
FIG. 2 indicates a structure of a virtual computer program 40.

Meanwhile, the access program 41 and the VM program 42 form a virtual computer program 40 together. FIG. 2 indicates a structure of the virtual computer program 40.

The host OS 43, the VM monitor 44, the business program 46, the access program 41, the guest OS 45 and the VM program 42 are stored in the memory 31 and executed by the CPU 22. The host OS 43, the VM monitor 44, the business program 46, the access program 41, the guest OS 45 and the VM program 42 may be loaded from a computer-readable recording medium 90 which can be read by the computer 21 into the memory 31 before being executed. The host OS 43 and the guest OS 45 are Windows (registered trademark) or UNIX (registered trademark), for example. The host OS 43 and the guest OS 45 may be of the same kind or of a different kind.

The business program 46, the access program 41 and the VM monitor 44 are executed under control of the host OS 43. The business program 46 is an application program for performing such as account processing, for example. The business program 46 may be a database management program or a middleware program like a system management program.

The host OS 43 and a business processing program 46 read and write various types of information such as job data and control data from and to the memory unit 30 during its execution. When an operator performs maintenance, there is a case where the operator read or change (so-called patching) such information from the terminal 70. The present invention prevents negative influence of such a program for maintenance (the VM program 42) on the virtual computer system 10 caused by the program accessing the memory unit 30, while enabling flexible description of the program.

The VM monitor 44 is a program which realizes a virtual computer 50 in the virtual computer device 20. The VM monitor 44 is VMware (registered trademark) or a similar program, for example. The VM program 42 and the guest OS 45 are executed by the CPU 22 under the control of the VM monitor 44. It is also described as the VM program 42 and the guest OS 45 are executed by the virtual computer 50. Further, the VM program 42 is executed under the control of the guest OS 45.

Meanwhile, the VM monitor 44 can set up a virtual disk 52 in the virtual computer 50 using the external storage 32. The virtual disk 52 is accessed by a program executed by the virtual computer 50 such as the VM program 42.

Figure 3:
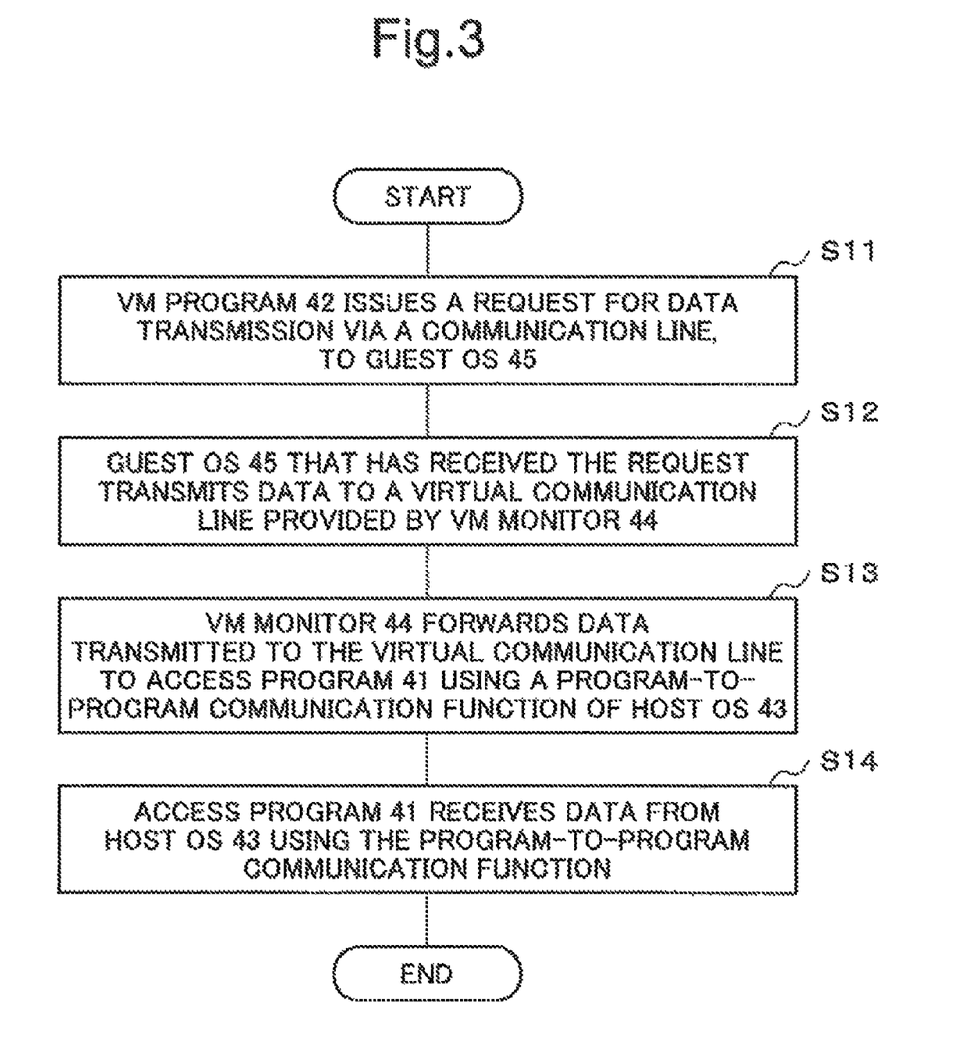
FIG. 3 is a flow chart of processing in which a VM program 42 transmits data to an access program 41.
Figure 4:
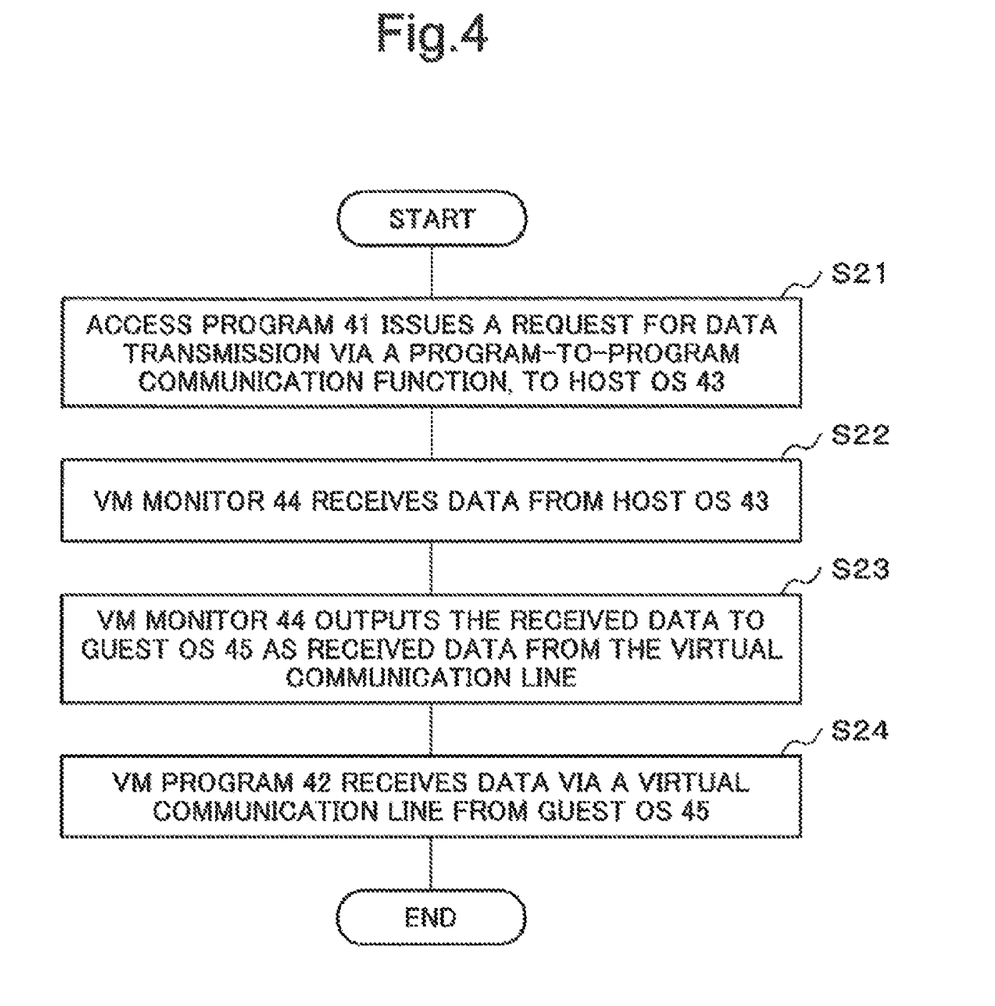
FIG. 4 is a flow chart of processing in which the access program 41 transmits data to the VM program 42.

The access program 41 and the VM program 42 perform data communication mutually. FIG. 3 and FIG. 4 indicate a realization example of such communication. The communication between the access program 41 and the VM program 42 may be realized using other methods.

FIG. 3 is a flow chart of processing by which the VM program 42 transmits data to the access program 41. Meanwhile, a program is described as an operation subject below, but to be exact, the operation subject is the CPU 22 which executes such program.

The VM program 42 issues a request for data transmission via a communication line, to the guest OS 45 (S11). The VM program 42 may perform this request by using APIs (Application Program Interfaces) for a communication via a communication line which the guest OS 45 provides. The communication destination address is a virtual address assigned to the access program 41.

The guest OS 45 that has received the request transmits data to a virtual communication line provided by the VM monitor 44 (S12). At that time, the VM monitor 44 virtually executes communication input/output instructions and interruptions of the guest OS 45. For this, the VM monitor 44 may, for example, substitute a communication driver and an interrupt handler of the guest OS 45 during initialization of the guest OS 45. This technology is a publicly known technology in the virtual machine field, and detail description will be omitted.

The VM monitor 44 forwards data transmitted to the virtual communication line to the access program 41 using a program-to-program communication function of the host OS 43 (S13). The VM monitor 44 may perform this request by using a program-to-program communication APIs which the host OS 43 provides. For this, the VM monitor 44 may include a table describing correspondence between the name and the virtual communication address of the access program 41 and the VM program 42, and refer to it in this forwarding processing.

Finally, the access program 41 receives data from the host OS 43 using the program-to-program communication function (S14). The access program 41 may perform this reception by issuing a program-to-program communication APIs which the host OS 43 provides.

FIG. 4 is a flow chart of processing by which the access program 41 transmits data to the VM program 42.

The access program 41 issues a request for data transmission via a program-to-program communication function, to the host OS 43 (S21). The access program 41 may perform this request by using program-to-program communication APIs which the host OS 43 provides. The access program 41 designates the VM monitor 44 as a communication partner and designates the name of the VM program 42 as a forwarding destination of data.

The VM monitor 44 receives data from the host OS 43 (S22). The VM monitor 44 may perform this reception by using program-to-program communication APIs which the host OS 43 provides.

The VM monitor 44 outputs the received data to the guest OS 45 as received data from the virtual communication line (S23). At that time, the VM monitor 44 virtually executes communication input/output instructions and interruptions of the guest OS 45. For this, the VM monitor 44 may, for example, substitute a communication driver and an interrupt handler of the guest OS 45 during initialization of the guest OS 45. It is a publicly known technology in the virtual machine field, and detailed description of this technology will be omitted. For this, the VM monitor 44 may include a table describing correspondence between the name and the virtual communication address of the access program 41 and the VM program 42, and refer to it in this output processing.

The VM program 42 receives data via a virtual communication line from the guest OS 45 (S24). The VM program 42 may issue this request by using APIs for communication via a communication line which the guest OS 45 provides. Communication partner's address is a virtual address assigned to the access program 41.

The access program 41 receives an input request from the VM program 42, inputs data from the memory unit 30 and outputs the input data to the access program 41. That is, the VM program 42 performs input from the memory unit 30 via the access program 41.

The access program 41 receives an output request and output data from the VM program 42 and outputs the output data to the memory unit 30. That is, data is outputted to the memory unit 30 from the VM program 42 via the access program 41.

Figure 5:
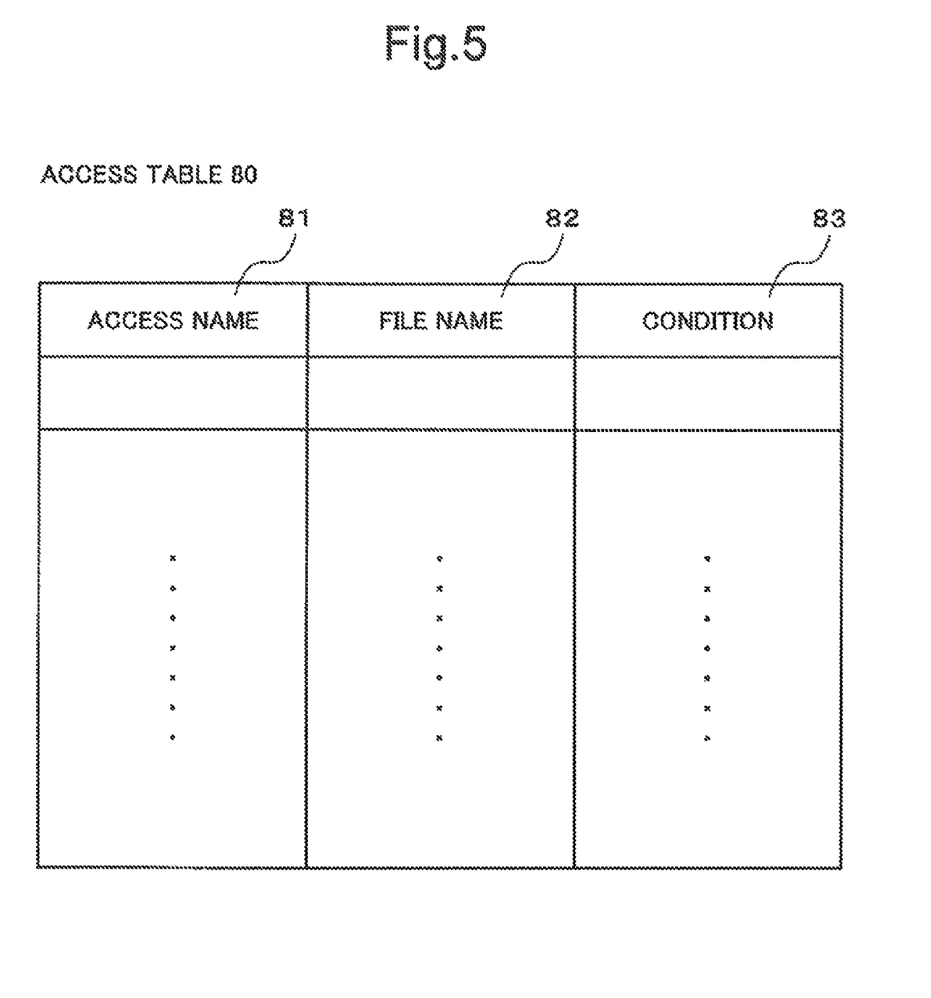
FIG. 5 indicates a structure of an access table 80.

The range of data of the memory unit 30 that the access program 41 inputs and outputs is limited to the range registered with the access table 80 shown in FIG. 5. The access table 80 stores an access name 81, a file name 82 and a condition 83 in a manner they are associated with each other. The file name 82 contains the name of file 33 on the host OS 43 or a name that designates the memory 31. The access program 41 obtains access name 81 from the VM program 42, and inputs or outputs data of file 33 with corresponding file name 82 or the memory 31 in a range that meets condition 83.

Here, condition 83 is information for identifying a part of records in file 33. For example, when a target is file 33 that is a log file, it is information for specifying such as log output time ranges, log output program names, a partner's communication address and a used protocol type. Condition 83 may be Null. In this case, all records of file 33 of file name 82 can be the input/output targets of the access program 41. The condition 83 may be an address range designating an accessible area in the memory 31 (such as the area of a control table and the area of a specific program).

Figure 6:
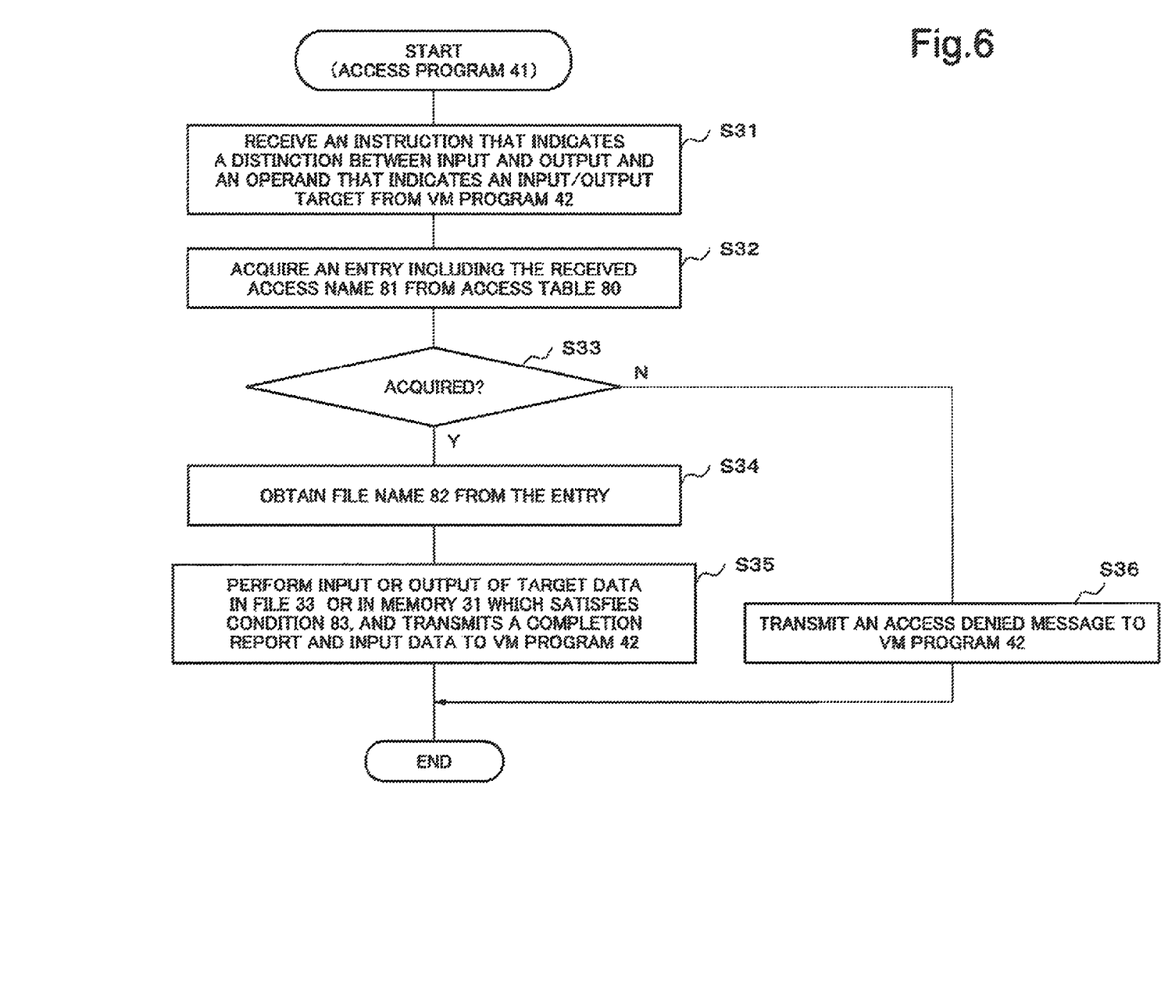
FIG. 6 is a flow chart showing an example of operation of the access program 41.

FIG. 6 is a flow chart showing an example of operation of the access program 41.

The access program 41 receives an instruction that indicates a distinction between input and output and an operand that indicates an input/output target from the VM program 42 (S31). The instruction is Show (input), Modify (output) or the like, for example. The operand is access name 81, for example. An input/output request may include specific record designation (the second operand), output data (the third operand) and the like.

The access program 41 acquires an entry including the received access name 81 from the access table 80 (S32). When it cannot be acquired (at S33, N), the access program 41 transmits an access denied message to the VM program 42 (S36).

When acquired (at S33, Y), the access program 41 obtains file name 82 from the entry (S34).

The access program 41 obtains or outputs target data in the file 33 or in the memory 31 which satisfies the condition 83, and transmits a completion report and input data to the VM program 42 (S35). For example, the access program 41 obtains all records which satisfy the condition 83 from the file 33 and transmits them to the VM program 42. Alternatively, the access program 41 searches for records corresponding to the second operand from records of the file 33 which satisfy the condition 83 to transmit them to the VM program 42 or to update them with the data designated by the third operand.

Meanwhile, when there are no records which correspond to the second operand within the records of the file 33 which satisfy the condition 83, the access program 41 may transmit an access denied message to the VM program 42 (S36).

Specifically, when an input request of "Show log1" is received, the access program 41 obtains file 33 of execution logs of the business program 46 from the external storage 32 and transmits the obtained data to the VM program 42.

Similarly, when an input request of "Show log2" is received, for example, the access program 41 obtains file 33 of communication logs of the host OS 43 from the external storage 32 and transmits the obtained data to the VM program 42.

Further, when an input request of "Show Control-Block" is received, for example, the access program 41 obtains control table data from a specified control table area of the host OS 43 in the memory 31, and transmits the obtained data to the VM program 42.

About output, when an output request of "Modify Config" is received, for example, the access program 41 updates a particular region of file 33 of configuration information of the host OS 43 in the external storage 32 with data received from the VM program 42.

Input/output requests which the access program 41 receives from the VM program 42 and carries out are only requests which have been set in the access table 80 in advance, as mentioned above. An input/output request other than those is refused. That is, the VM program 42 can access the memory unit 30 only within the range where the access program 41 inputs and outputs.

The VM program 42 communicates with the terminal 70. This communication is realized as communication to a virtual terminal of the virtual computer 50. For example, the VM program 42 receives a maintenance command from the terminal 70 and carries out it. On the occasion of executing a maintenance command, when data input from the memory unit 30 or data output to the memory unit 30 is needed, the VM program 42 transmits an input/output request to the access program 41 and input/output is performed via the access program 41.

For example, when an output request of file 33 of communication logs of the host OS 43 is received, the VM program 42 issues an input request of "Show log2" to the access program 41. After receiving input data from the access program 41, the VM program 42 transmits the received data to the terminal 70 in order to display it.

Also, when an update request of a particular region of file 33 of configuration information of the host OS 43 is received with update information, the VM program 42 issues an output request of "Modify Config" to the access program 41 and updates the file 33 of configuration information.

Processing which can be described as the VM program 42 is not limited to simple command processing like the above examples. Execution processing of a sophisticated maintenance command for facilitating maintenance by an operator can be described. For example, as the VM program 42, processing for identifying communication contents at the time when the business program 46 has caused a failure by comparing execution logs of the business program 46 and communication logs of the host OS 43 can be described.

Further, the VM program 42 can access the virtual disk 52 provided in the virtual computer 50. Accordingly, as the VM program 42, processing for obtaining the latest patch from a maintenance database stored in the virtual disk 52 to apply it to the host OS 43 is describable. Of course, as a premise, an output request for rewriting a program area of the host OS 43 stored in the external storage 32 by the access program 41 must be permitted in the access table 80.

Figure 7:
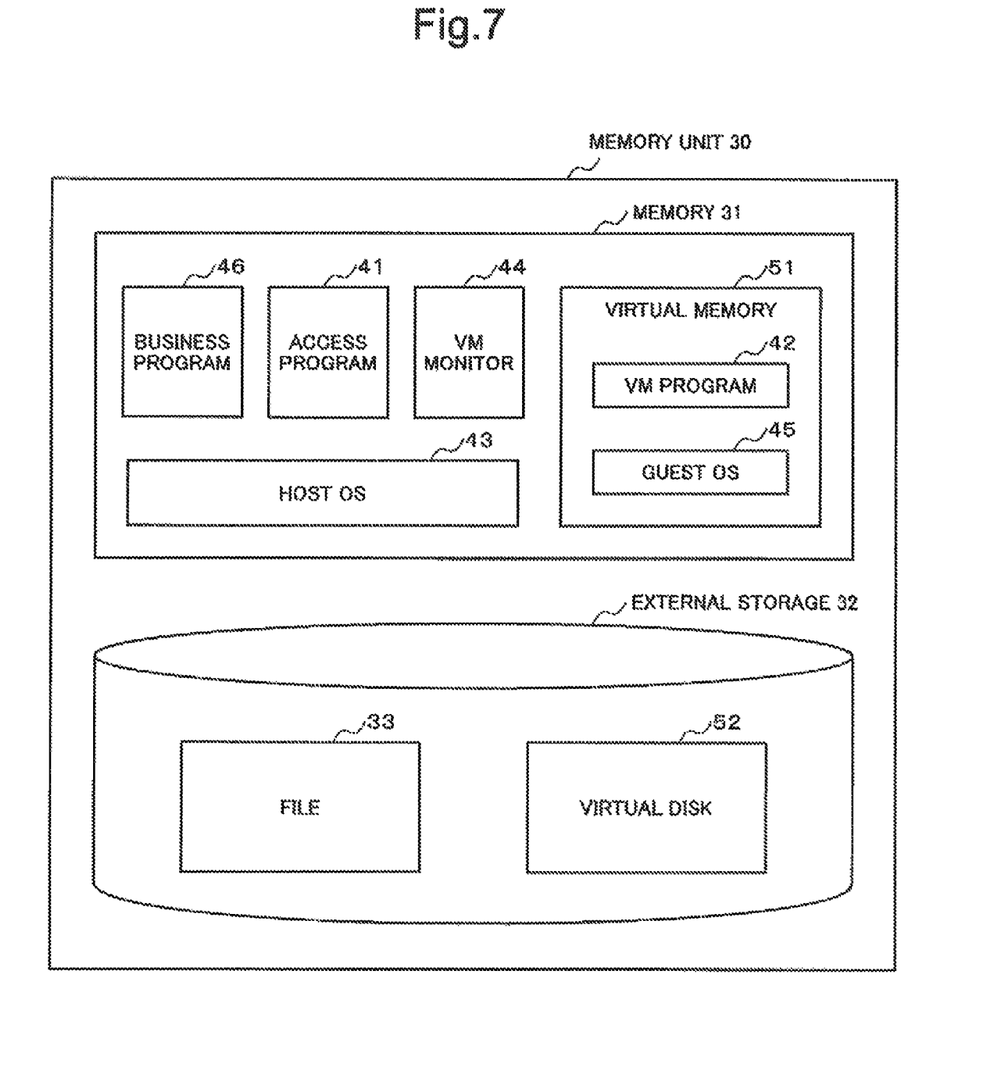
FIG. 7 indicates a structure of a memory unit 30.

Meanwhile, the VM program 42 can access a part of the memory unit 30 other than the area for the virtual computer 50 only via the access program 41. FIG. 7 shows this situation.

FIG. 7 indicates a structure of the memory unit 30. The memory 31 includes a virtual memory 31 for the virtual computer 50. The VM program 42 and the guest OS 45 are stored on the virtual memory 31. The host OS 43 and the business program 46 (both of a program and data) are stored in the memory 31 other than the virtual memory 31.

The VM monitor 44 controls the guest OS 45 and the VM program 42 which are executed under its control such that they are allowed access only within the range of this virtual memory 31. Because this method is general in the virtual machine technology, detailed description will be omitted.

Similarly, the external storage 32 includes the virtual disk 52 for the virtual computer 50. File 33 that the host OS 43 and the business program 46 access is stored in an area of the external storage 32 other than the virtual disk 52. The VM monitor 44 controls the guest OS 45 and the VM program 42 which are executed under its control such that they are allowed access only within the range of this virtual disk 52. Because this method is general in the virtual machine technology, detailed description will be omitted.

Meanwhile, in this embodiment, the access program 41 (including the access table 80) is prepared and registered by an administrator of the virtual computer system 10 along with the business program 46, and is of a relatively fixed nature. On the other hand, the VM program 42 is prepared and registered by an operator of the terminal 70 according to needs of the operator, and is corrected and customized relatively frequently. The VM program 42 may be created and corrected particularly customizing to maintenance work when the maintenance work is performed.

An effect of this embodiment is that, even when there is a bug or an input mistake from the terminal 70, it is possible to prevent negative influence of the VM program 42 running out of control or the like on the host OS 43 and the business program 46 while ensuring flexibility in describing the VM program 42. Such negative influence includes destruction and a leak of important data stored in the memory unit 30, for example. A reason that this effect is made is that the VM program 42 is executed in a manner that it is shut in the virtual computer 50, and input/output to and from the memory unit 30 in a range required for maintenance is carried out via the access program 41. Another reason is that a range accessible from the access program 41 is limited to a range which is registered in the access table 80.

According to the present invention, flexible and safe access control becomes possible compared with a data protection method in which important data is accessible only in a privileged mode while the VM program 42 is executed in a non-privileged mode. The reason of this is that flexible and careful access restriction becomes possible by the access program 41 (the access table 80). Another reason is that, description of the VM program 42 (types of system calls which can be issued, for example) is not affected by the restrictions derived from a non-privileged mode.

Meanwhile, application of the present invention is not limited to a maintenance purpose. Also in general business processing such as account processing, it is useful for safely permitting a program which a user of the terminal 70 can customize (it corresponds to the VM program 42) to access a part of important file 33.

The access program 41 does not have to make both of the memory 31 and the external storage 32 an accessing object. It may be configured such that, by changing the access table 80, the access program 41 makes only either one of the memory 31 and the external storage 32 an accessing object.

In the second embodiment of the present invention, the access program 41 outputs records of accessing the external storage 32 to an inspection terminal or the like which is not illustrated in Figures.

By analyzing such log, operation of the VM program 42 can be verified, and safety of the virtual computer system 10 can be improved further.

Figure 8:
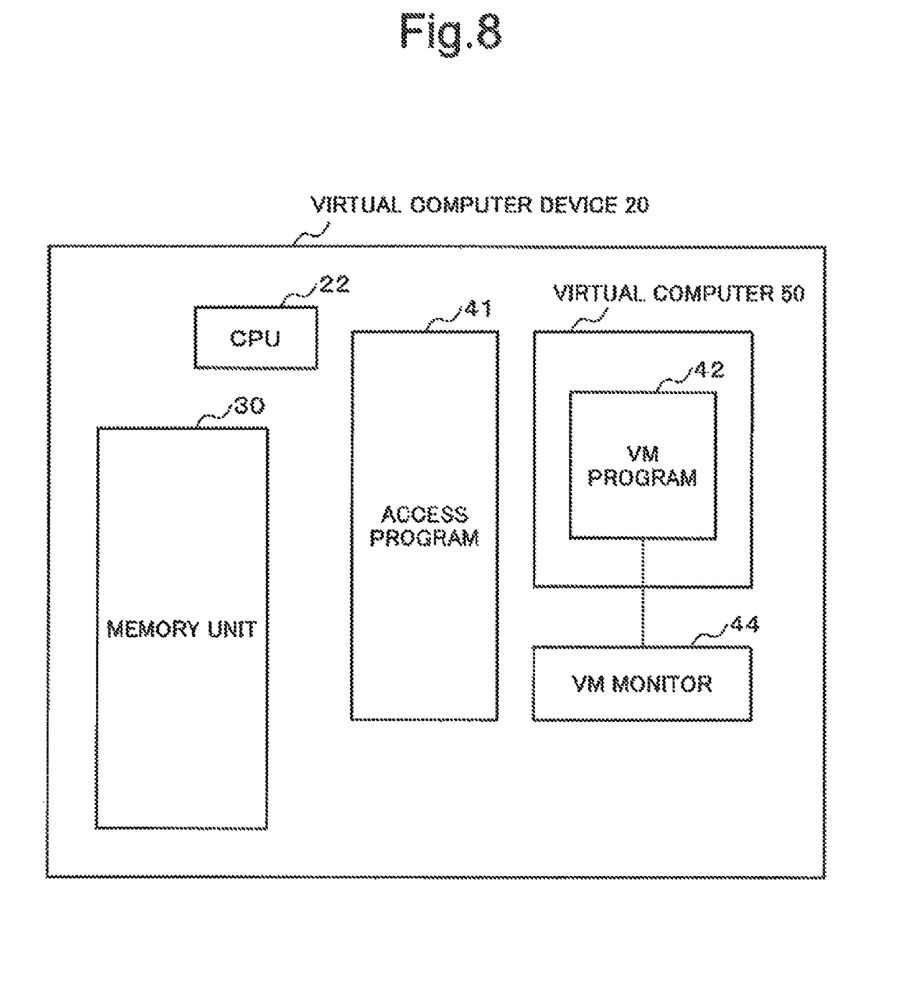
FIG. 8 indicates the basic configuration of the present invention.

FIG. 8 shows the basic configuration of the present invention. The virtual computer device 20 includes the memory unit 30 and the CPU 22. The CPU 22 executes the access program 41 that makes the CPU 22 perform input from or output to the memory unit 30 according to an input/output request which has been received, and the VM monitor 44 that makes the CPU 22 realize the virtual computer 50. Moreover, the CPU 22 executes the VM program 42 that, under the control of the VM monitor 44 (in the virtual computer 50), makes the CPU 22 issue an input/output request to the access program 41 to perform input from or output to the memory unit 30 via the access program 41.

As above, the present invention has been described with reference to the exemplary embodiments. However, the present invention is not limited to the above-mentioned exemplary embodiments. Various changes in the composition and details of the present invention which a person skilled in the art can understand can be made within the scope of the present invention.

This application claims priority based on Japanese application Japanese Patent Application No. 2008-188132 filed on Jul. 22, 2008, the disclosure of which is incorporated herein in its entirety.

The invention claimed is:

1. A virtual computer device comprising:
a memory unit which includes a first memory area for a virtual memory storing a guest operating system (OS) including a virtual machine (VM) program executing on the guest OS and a virtual disk of a virtual computer, and a second memory area, which is different than said first memory area and stores a host OS, an application program, an access program and a file to be accessed by the host OS and the application program; and
a CPU which executes, under the control of the host OS, the access program that performs input from or output to the second memory area, the application program, and a VM monitor to execute the VM program on the guest OS under control of the VM monitor and
wherein the VM program stored in the first memory area performs input from or output to the second memory area using the access program via the VM monitor and the host OS.

2. The virtual computer device according to claim 1, which executes the access program to perform input from or output to a predetermined range of the second memory area, but not to memory areas in the second memory area that are outside said predetermined range.

3. The virtual computer device according to claim 2, which executes the VM program to output information inputted from a terminal to the second memory area using the access program, or to display on the terminal, information inputted from the second memory area using the access program.

4. The virtual computer device according to claim 3, wherein the memory unit includes a memory which comprises:
an external storage which includes an area associated with the first memory area which is used as a virtual disk, and an area associated with the second memory area which is occupied by a file of the host OS.

5. A virtual computer system including a virtual computer device according to claim 4 and the terminal.

6. A computer readable non-transitory medium having recorded thereon a virtual computer program, which includes an access program and a virtual machine (VM) program, and which when executed by a computer comprising a memory unit which includes a first memory area for a virtual memory storing a guest operating system (OS) including a VM program executing on the guest OS and a virtual disk of a virtual computer and a second memory area, which is different than said first memory area and stores a host OS, an application program, an access program, and a file to be accessed by the host OS and the application program,     executes, under the control of the host OS, a VM monitor, the application program, and the access program;

executes the VM program on the guest OS, under the control of the VM monitor;

executes the access program, that performs input from or output to said second memory area; and     wherein the VM program stored on the first memory area performs input from or output to the second memory area using the access program via the VM monitor and the host OS.

7. The computer readable non-transitory medium according to claim 6, having recorded thereon the virtual computer program, wherein the access program is executed by the computer to perform input from or output to a predetermined range of the second memory area, but not to memory areas in the second memory area that are outside said predetermined range.

8. The computer readable non-transitory medium according to claim 7, having recorded thereon the virtual computer program, wherein the VM program is executed by the computer to output information inputted from a terminal to the second memory area using the access program, or to display on the terminal, information inputted from the second memory area using the access program.

9. A control method, which when used on a computer comprising a memory unit that includes a first memory area for a virtual memory storing a guest operating system (OS) including a virtual machine (VM) program executing on the guest OS and a virtual disk of a virtual computer, and a second memory area different than said first memory area and stores a host OS, an application program, an access program and a file to be accessed by the host OS and the application program comprises:

executing, under the control of the host OS, a VM monitor, the application program, and the access program;

executing, the VM program on the guest OS, under the control of the VM monitor; and     executing the access program, that performs input from or output to the second memory area; and     wherein the VM program stored on the first memory area performs input from or output to the second memory area using the access program via the VM monitor and the host OS.

10. The control method according to claim 9, wherein the computer executes the access program to perform input from or output to a predetermined range of the second memory area, but not to memory areas in the second memory area that are outside said predetermined range.

11. The control method according to claim 10, wherein the computer executes the VM program to output information, inputted from a terminal, to the second memory area using the access program, or to display on the terminal, information inputted from the second memory area using the access program.

\* \* \* \* \*